United States Patent Office 3,554,035
Patented Jan. 12, 1971

3,554,035
PRESSURE DETECTION AND MEASURING DEVICES
Pierre R. Buisson, 16 Avenue Victor Hugo, 92 Vanves, France, and Georges C. Denegre, 18 Rue Gramme, 75 Paris, France
Filed Apr. 11, 1968, Ser. No. 720,633
Claims priority, application France, Apr. 13, 1967, 102,667
Int. Cl. G01l 7/06
U.S. Cl. 73—410                  8 Claims

ABSTRACT OF THE DISCLOSURE

A device for measuring variations of pressure, comprising a deformable element in which the errors of measurement due to the phenomenon of hysteresis in the material constituting said element are reduced substantially to zero by choosing the form of the deformable element and the thickness of its wall in such manner that the thickness of said wall varies in a linear manner with the radius of said wall, whereby the stress-gradient is made small or zero throughout the whole mass of the material of the deformable element.

---

The present invention relates to pressure-detection devices, that is to say to apparatus intended for the measurement of variations of pressure, and the invention has for its object the production of pressure detectors which are substantially free from the phenomenon of "hysteresis." In the context of the present description, the term "hysteresis" employed to indicate the fact that the cycle of the various parameters followed during one operation of the device is not exactly reproduced during a reversal of the cycle, all other conditions of the operation remaining unchanged. The phenomenon is thus analogous to magnetic hysteresis.

Certain pressure detectors are constituted by the association of a deformable element with a device for measuring the modifications of shape resulting from variations in pressure. The deformable elements usually employed take the most varied forms in which, generally speaking, the stresses are certainly not equally distributed throughout the whole mass of the material of which the element is made.

There can generally be observed a local hysteresis effect which is attributable to the physical properties of the material, is affected by its nature, the method of machining employed and the treatments which modify its structural state. It should be noted that this phenomenon of hysteresis generally occurs considerably before the elastic limit is reached throughout the whole of the material of the deformable element.

According to studies carried out on the strength of materials, such as those made by Griffith and subsequently referred to by many other authors, the existence is observed of local defects in the form of superficial micro-fissures or internal decohesions. These defects cause a closing-up at these points of the isostatic network which indicates a higher local stress-gradient, and this, in these small elements of volume may exceed the elastic limit. At these points, slip takes place in the body of the material and this tends to equalize the stresses. These phenomena are of a partial nature as long as the elastic limit is not reached throughout the whole of the mass.

While it is admitted that hysteresis results from partial phenomena, the statistical average of which increases following a nonlinear law with the increase in stress-gradient, its incidence remains small as long as the statistical stress gradient and the local stress-gradient remains small.

The considerations advanced above relate only to the microscopic scale; it is therefore essential that they should be transposed to the scale of the actual object. Hence, the deformable element should be designed in a form such as to avoid any considerable variations of stress, the maximum value of which must remain small.

According to the invention, a pressure detector comprises a deformable element in which the errors of measurement due to the phenomenon of hysteresis in the material constituting the said element are reduced substantially to zero by choosing the form of the deformable element and the thickness of its walls in such manner that the stress-gradient is small or zero throughout the whole mass of the material of the said element.

The forms of deformable element in which the condition of equal stress-gradient throughout the whole mass is satisfied, correspond to two types:

In the first type, the wall of the element has a constant thickness and the general shape ensures equal stress; the spherical form with a thin wall satisfies this condition;

In the second type, the shapes of the element are very varied and equal stress gradient throughout the whole mass is ensured by giving the wall a varying thickness, the spherical shape being only one particular case in which the variation in thickness of the wall is theoretically nil.

Various forms of embodiment of the invention will now be described below, by way of example only and not in any limitative sense, reference being made to the accompanying drawings, in which.

Figure 1:
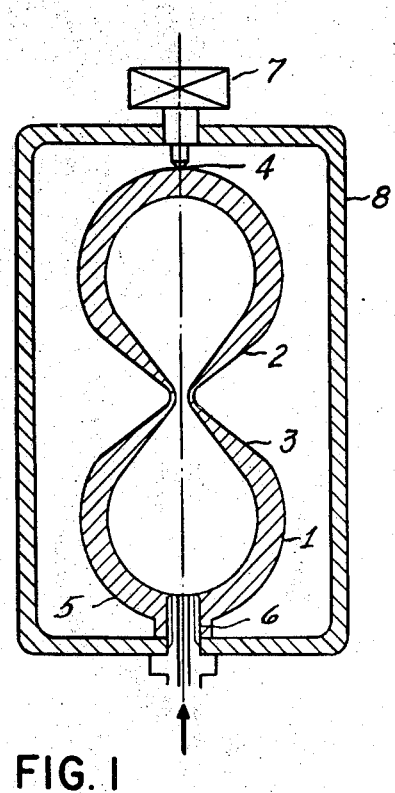
FIG. 1 shows a pressure detector in which the deformable element is constituted by two truncated cones coupled together by their small bases and closed at their large bases by hemispherical envelopes.

In the embodiment shown in FIG. 1, the deformable element 1 has an axis of revolution about which the element is formed by rotation of a generatrix of the element consisting of a cross-sectional surface of the oppositely-mounted truncated cones 2 and 3, in which the thickness of the wall varies in a linear manner with the radius of the wall, each cone being closed over its large base by a hemispherical envelope 4 and 5 of constant thickness, since the radii of these envelopes are ipso facto constant. The central axis of each of the cones 2 and 3 lie on the axis of revolution of the element and these cones constitute radiused wall portions of the element. The radii of cones 2 and 3 are therefore measured from the axis of revolution and the thickness of the cone wall varies directly and linearly with the radial distance of the wall from the axis.

This form is very close to the ideal shape which ensures an equal stress-gradient at all points; however, this condition cannot be entirely observed at the level of the fluid-intake orifice 6.

The elongation of the deformable element is measured by an elongation or displacement detector gauge 7 without internal friction, for example a differential capacity gauge such as that described in U.S. Pat. No. 2,611,964.

The mechanical coupling between the measuring gauge and the deformable element is effected through a rigid frame 8 which is not subjected to any stress.

Figure 2:
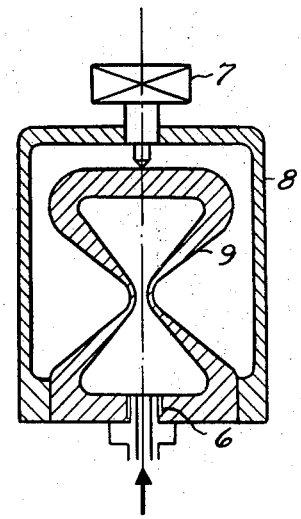
FIG. 2 shows a pressure detector comprising a deformable element having the shape of a diabolo.

In FIG. 2, the deformable element 9 has the form of a pair of truncated cones integrally connected at their small ends and each having its opposite base end closed by a thick disc-like wall, the condition of equal stress-gradient being again achieved by a linear variation of each conical wall thickness with the radius of the wall as measured from the axis of revolution of the element. The elongation of the element is measured by means of an extensometer gauge 7 of conventional type, without internal friction as in the gauge of FIG. 1. The mechanical coupling in this embodiment is also effected by a rigid frame 8 which is not subjected to stress. The intake of fluid under pressure is effected at 6 in a thicker portion of the wall.

This particular form gives a relatively-large displacement in the direction of the axis, the expansion in diameter in the central zone also causing displacement of the end portions of the deformable element in the direction of its axis.

Figure 3:
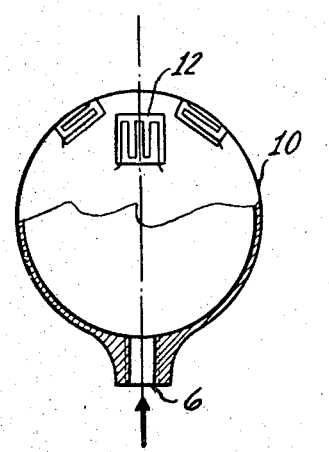
FIG. 3 shows another form of construction of pressure detector, in which the thickness of the wall of the deformable element is constant, the condition of equal stress being satisfied by a spherical form.

The relative size of the conical elements of the deformable element of FIG. 1 can be reduced until they are completely eliminated. The deformable element 10 then takes the form of a sphere, which, s shown in FIG. 3, is defined by the rotation of an annular generatrix about an axis of revolution extending interiorly of the element. The sphere thus provided constitutes a radiused wall having its center of curvature lying on the axis of revolution. Accordingly, since the radius of the sphere is the radial distance of the wall from this point on the axis of revolution, the essential condition that the thickness of the wall vary linearly with the radius of the wall is satisfied by a constant thickness of the said wall since the radius of the sphere is constant.

The deformable element 10, constituted by a hollow sphere with thin walls, has the greatest possible development with respect to the dimension of the neck utilized for the passage 6 of the fluid under pressure.

The stress measurement is effected by the use of strain-gauges 12, for example, following the usual practice.

Figure 4:
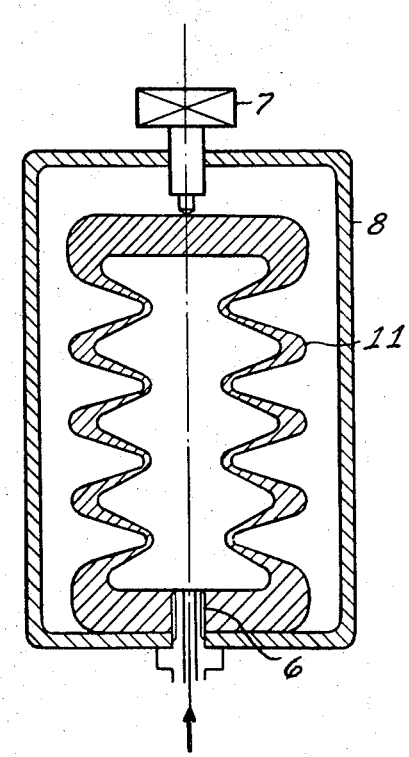
FIG. 4 shows a pressure detector comprising a deformable element having the shape of a bellows.

In cases where it is necessary to have increased sensitivity, a number of truncated cones are assembled together successively by their large and small bases, as shown in FIG. 4. In this way, there is obtained a deformable element 11 of the bellows type, in which the linear variation of the wall thickness with the radius ensures the condition of equal and minimum stress and constitutes the essential characteristic of the invention.

The measurement of the elongation is effected by a dimensional gauge 7 and a rigid frame 8, as in the case of FIGS. 1 and 2.

Whatever the form of the deformable element may be, it is possible:

To measure the stress by means of extensometer gauges of known type, mounted in the zone farthest away from the fluid-inlet neck, at which the rule of equal stress cannot be completely respected;

To measure the elongation by means of a dimension gauge of known type, the deformable element being, for example, utilized as a moving electrode and adapted to vary the impedance of an electrical detector;

To utilize any other method of measurement of elongation or stress, without thereby departing from the scope of the present invention.

The deformable elements described and illustrated have been given merely by way of examples, and many other forms may readily be adopted to fall within the scope of the invention.

What we claim is:

1. In a pressure detector having a deformable element in which the errors of measurement due to the phenomenon of hysteresis in the material constituting said element are reduced substantially to zero comprising, a body of revolution formed by rotating a generatrix of said elements about an axis extending interiorly of the body and having a radiused wall portion the thickness of which varies directly and linearly with respect to the radial distance of said wall portion from said axis and means for the measurement of the stresses in said deformable element.

2. A pressure detector as claimed in claim 1, wherein said body of revolution comprises a deformable element of hollow spherical shape ensuring a low stress-gradient through the whole mass of the material constituting said element, the condition of linear variation of the wall thickness of said element with the radius of said wall being satisfied by a constant thickness of said wall.

3. A pressure detector as claimed in claim 2, in which the means for measurement of the stresses in said deformable element is a plurality of strain-gauges.

4. A pressure detector as claimed in claim 1 wherein said deformable element comprises a pair of oppositely-mounted truncated cones each having a lateral wall thickness which varies directly and linearly with the radius of the cones and wherein said means for the measurement of the stresses comprises a conventional extensometer gauge without internal friction, and which includes a rigid frame forming a mechanical coupling means between said extensometer and said deformable element.

5. In a pressure detector, the combination of, a deformable element which ensures a low stress-gradient throughout the whole mass of the material constituting said element comprising two truncated cones in which the thickness of the wall of each varies directly and linearly with the radius of said cones and which have their small bases adjacent and integral, and means closing the large base of each of said truncated cones.

6. A pressure detector as claimed in claim 5 wherein said means closing the large bases comprises hemi-spherical walls of substantially uniform wall thickness.

7. A pressure detector as claimed in claim 5 which includes means for the measurement of the elongation of said deformable element which includes a dimension gauge without internal friction and a rigid frame forming a mechanical coupling means between said element and said gauge.

8. A pressure detector as claimed in claim 5 wherein said deformable element comprises a plurality of truncated cones positioned in series along a common axis with adjacent cones being oppositely disposed and integrally connected together by their large and small bases.

References Cited

UNITED STATES PATENTS

| | | | |
|---|---|---|---|
| 1,761,130 | 6/1930 | Kennedy | 73—410 |
| 2,442,938 | 6/1948 | Ruge | 73—398 |
| 2,786,488 | 3/1957 | Mercier | 92—92X |
| 3,205,710 | 9/1965 | Mamiya et al. | 73—410 |
| 3,206,159 | 9/1965 | Anderson et al. | 92—34X |
| 3,313,319 | 4/1967 | Osborn et al. | 92—34X |
| 3,319,532 | 5/1967 | Pridham, Jr. | 92—34 |
| 2,470,714 | 5/1949 | Nevius | 73—398X |

LOUIS F. PRINCE, Primary Examiner

J. W. ROSKOS, Assistant Examiner